(12) United States Patent
Miller

(10) Patent No.: US 7,223,827 B1
(45) Date of Patent: May 29, 2007

(54) WATER CONTROL IN A SUBSURFACE FORMATION

(75) Inventor: Edward E. Miller, Plano, TX (US)

(73) Assignee: Fritz Industries, Inc, Mesquite, TX (US)

( * ) Notice: Subject to any disclaimer, the term of this patent is extended or adjusted under 35 U.S.C. 154(b) by 141 days.

(21) Appl. No.: 10/789,207

(22) Filed: Feb. 27, 2004

(51) Int. Cl.
*C08F 120/06* (2006.01)

(52) U.S. Cl. .................... 526/317.1; 526/290; 526/187; 526/173; 526/174

(58) Field of Classification Search ............. 526/317.1, 526/290, 187, 173, 174
See application file for complete search history.

(56) References Cited

U.S. PATENT DOCUMENTS 6,297,336 B1 * 10/2001 Shioji et al. ............. 526/317.1

6,399,668 B1 * 6/2002 Miyake et al. ................ 521/92

FOREIGN PATENT DOCUMENTS

| JP | 03-014809 | * | 1/1991 |
| JP | 03014809 | | 1/1991 |

* cited by examiner

*Primary Examiner*—Robert D. Harlan
(74) *Attorney, Agent, or Firm*—Thomas R. Weaver

(57) ABSTRACT

A composition and a method of using the composition to adjust the permeability of a subsurface formation is disclosed. The composition is a water insoluble gel made by cross linking a water soluble polymer. The water soluble polymer is made by polymerizing a precursor composition, wherein the precursor composition is a mixture of an acrylic acid compound and a reactant comprised of a divalent metal salt of the acrylic acid compound.

12 Claims, No Drawings

WATER CONTROL IN A SUBSURFACE FORMATION

BACKGROUND OF THE INVENTION

1. Technical Field of the Invention

This invention broadly relates to a composition for controlling the flow of water in a subsurface formation. This invention further relates to and a method of controlling the flow of water from and into a hydrocarbon containing subsurface formation. The invention more specifically relates to the use of a modified cross linked acrylic acid polymer in a method of controlling the flow of water in a high temperature hydrocarbon containing subsurface formation.

2. Description of the Prior Art and Problems Solved

It is well known in the art, that a subsurface formation which contains hydrocarbons, such as petroleum and gas, also contains salt water, referred to as formation water. It is equally known in the art, that recovery of the petroleum and gas from the formation inherently involves recovery of formation water along with the hydrocarbons. The recovery of water together with the hydrocarbons is generally regarded in the art as an undesirable aspect of the oil production process because the water, along with the desirable fluids, must be pumped from the formation to the surface where it must be separated from the desirable fluids and then it must be disposed of in some appropriate fashion. This handling of formation water is an economic and a technical burden imposed on producers which burdens, at some point in time, can become so great that oil and gas production is either terminated to avoid the water problem or steps are taken to prevent the recovery of water, or at least to reduce the volume of water recovered. Such steps have been referred to in the art as water control and/or as water shut-off.

It is also known in the art to inject water into a subsurface formation to displace oil and gas from one part of the formation to another as a step in a process of enhancing the recovery of the desirable fluid from the formation. During water injection, the injected water can at times more readily flow into and through one part of the formation as compared to another part of the formation. The formation, or part thereof, into which the water more readily flows is sometimes referred to as a thief zone. The flow, thus, is not uniform with the result that desired displacement of oil and gas is not achieved. It is believed that variations in the physical properties of the formation, for example, formation permeability and porosity, cause the mentioned non-uniform flow. Steps have been taken in the art to render the physical properties of a formation more uniform so as to cause injected water to uniformly flow into and through the entire formation. Such steps have been referred to in the art as profile modification and/or as conformance control.

The art has employed methods of water control and profile modification which methods feature the introduction of a polymeric material into a target formation to adjust the permeability of the formation. The intended result of the permeability adjustment is to block and/or to reduce the flow of water from a particular part of the formation or to make more uniform the flow of water through the formation. For purposes of this disclosure, the permeability adjustment of the formation is sometimes referred to as water flow regulation, or more simply, as water regulation.

Water control and profile modification of subsurface formations have been routinely performed using a variety of polymers, such as polyacrylamide, cellulose and xanthan gum. These polymers perform satisfactorily in shallow wells which ordinarily have low temperatures, however, they become unstable and do not perform satisfactorily in deeper wells in which temperatures are ordinarily higher. In response to the temperature problem, water control and profile modification in formations having elevated temperatures has been performed with nitrogen containing polymers developed to be stable at temperatures of about 400° F. Such polymers feature monomers, such as, 2-acrylamido-2-methyl-1-propanesulfonic acid, 4-acryloylmorpholine, 1-vinyl-2-pyrrolidone, N,N-methylene bis(meth)acrylamide, the sodium salt of vinylsulfonic acid and the sodium salt of styrene sulfonic acid.

It is known that acrylic acid polymers cannot be satisfactorily cross linked, but acrylic acid has been combined with the nitrogen containing monomers to produce copolymers having charged carboxyl sites to facilitate cross linking reactions between the copolymers. In one instance it has been reported that a blend of a nitrogen containing polymer, N,N-methylene bis(meth)acrylamide, and derivatives of acrylic acid, that is, a mixture of sodium acrylate and magnesium acrylate, has been polymerized to obtain a thermally aqueous stable gel.

It is believed that acrylic acid polymers have an excessive number of charged carboxyl cross linking sites which preferentially promote intra molecular bonding rather than inter molecular cross linking. Furthermore, acrylic acid polymers and cross linked acrylic acid polymers do not function as water control and profile modification materials, because they do not satisfactorily adhere to the walls of subsurface formations. It is believed that the inability of acrylic acid polymers and cross links thereof to satisfactorily adhere to subsurface formations is caused by the mentioned charges associated with the excessive number of carboxyl cross linking sites.

Accordingly, a problem existing in the art is the absence of a satisfactory ability to employ a stable water gel comprised of a cross linked acrylic acid polymer to regulate the flow of water into, in and through a subsurface formation, and in particular one having a temperature in excess of 400° F.

DISCLOSURE OF INVENTION

1. Summary of the Invention

This invention provides a water soluble polymer composition which, in one aspect, is a copolymer comprised of random repeat units of an acrylic acid compound and random repeat units of a divalent metal salt of the acrylic acid compound. In another aspect, the water soluble polymer composition of this invention is a terpolymer comprised of random repeat units of an acrylic acid compound, random repeat units of a divalent metal salt of the acrylic acid compound, and random repeat units of a monovalent metal salt of the acrylic acid compound. For purposes of simplicity, the acrylic acid based compound is sometimes referred to as an acrylic acid compound (AAC). Furthermore, the water soluble polymer composition of this invention is sometimes referred to as a water soluble acrylic acid polymer. In one embodiment, the acrylic acid compound is acrylic acid, the divalent metal salt of the acrylic acid compound is magnesium acrylate and the monovalent metal salt of the acrylic acid compound is sodium acrylate.

The water soluble polymer composition can be made by reacting, under polymerization conditions, two compounds selected from an acrylic acid compound (AAC) and a divalent metal compound ($YM_Z$).

The water soluble polymer composition of this invention can also be made by reacting, under polymerization conditions, three compounds selected from an acrylic acid compound (AAC), a divalent metal compound (YM$_Z$) and a monovalent metal compound (X$_N$M).

The water soluble polymer composition of this invention can also be made by reacting, under polymerization conditions, two compounds selected from an acrylic acid compound (AAC) and a monovalent metal compound (X$_N$M) to form a copolymer, followed by reacting the copolymer with a divalent metal compound (YM$_Z$) to produce a terpolymer.

The water soluble polymer composition of this invention can also be made by reacting, under polymerization conditions, an acrylic acid compound (AAC), a monovalent metal salt of the acrylic acid compound and a divalent metal salt of the acrylic acid compound.

It is believed that the polymerization reaction which produces the polymer composition of this invention neutralizes carboxyl groups, to thereby reduce charge and the number of reactive sites available for cross linking, while, at the same time, placing the divalent metal salt of acrylic acid and the monovalent metal salt of acrylic acid in the polymer composition.

This invention further provides a modified cross linked acrylic acid polymer which is water insoluble and stable at temperatures up to about 450° F. The modified cross linked acrylic acid polymer, referred to herein as a water insoluble gel, is made by reacting the water soluble polymer composition of this invention with a suitable cross linking agent. The water insoluble gel of this invention is useful as a water shut-off and profile modification material.

In the process of adjusting the permeability of a formation for the purpose of water flow regulation, the water soluble polymer composition of this invention can be mixed with a suitable cross linking agent at the surface of the earth to form a reaction mixture which is then injected into the target formation where the stable water insoluble gel is formed. In another method, the polymer composition and cross linking agent can be separately injected into the target formation in one or more sequences to form the stable water insoluble gel of this invention. In another method, the process of adjusting the permeability of a formation can be performed by utilizing a combination of the two previously mentioned methods. In any event, the water insoluble gel is substantially formed in the target formation.

The water insoluble gel of this invention is also useful as a temporary plug in a well bore and as a temporary plug in a pipeline.

2. Description of the Embodiments

It was previously mentioned that acrylic acid polymers cannot be satisfactorily cross linked, and that acrylic acid polymers and cross linked acrylic acid polymers do not function as water control and profile modification materials because they do not satisfactorily adhere to the walls of subsurface formations. It was stated that these deficiencies are believed to be caused by an excessive number of charged carboxyl cross linking sites on the acrylic acid polymers and on the cross linked acrylic acid polymers. In accordance with this invention, it has been discovered that the number of charged carboxyl sites can be reduced, in one aspect, by reacting an acrylic acid compound (AAC) with a divalent metal compound (YM$_Z$), and, in another aspect, by reacting an acrylic acid compound (AAC) with a divalent metal compound (YM$_Z$) and a monovalent metal compound (X$_N$M). The resulting reaction product is a water soluble polymer which can be cross linked to produce a water insoluble gel.

The water soluble polymer of this invention, in one aspect, is believed to be a random copolymer of acrylic acid and a divalent metal salt thereof, and, in another aspect, a random terpolymer of acrylic acid, a divalent metal salt thereof and a monovalent metal salt thereof.

The water soluble polymer of this invention can be characterized by the following structure which is referred to herein as Formula 1, below:

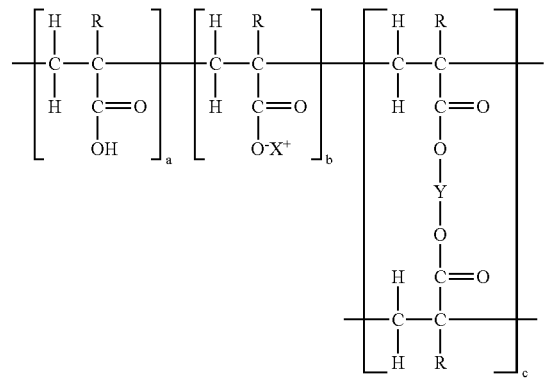

wherein, R is independently H and —CH$_3$; X is Na, K, Li, Rb, Cs, or NH$_4$; Y is Be, Mg, Ca, Sr, B or Zn. Referring to Formula 1, if the value of "a" is considered as 1.00, then "b" has a value in the range of from 0 to about 2.25 and "c" has a value in the range of from about 0.65 to about 2.75. In other words, there are about 0 to about 2.25 "b" units per one "a" unit and about 0.65 to about 2.75 "c" units per one "a" unit.

It is clear that the above structure can be comprised of random repeat units of acrylic acid and salts of acrylic acid or random repeat units of methacrylic acid and salts of methacrylic acid depending upon whether R is hydrogen or a methyl group.

The water soluble polymer of this invention can be made in any one of several ways. In this regard, an aqueous solution of an acrylic acid compound, represented by the formula CH$_2$=CR—COOH, can be mixed with appropriate quantities of a divalent metal compound, represented by the general formula YM$_Z$, and a monovalent metal compound, represented by the general formula X$_N$M. It is to be understood that presence of the monovalent metal compound is not required. In the above general formulas, R is hydrogen or a methyl group; Y is beryllium, magnesium calcium, strontium, barium or zinc; X is sodium, potassium, lithium, rubidium, cesium or an ammonium group; M is oxygen, a hydroxide group or a carbonate group; $_Z$ is 1 or 2, depending on the valence of M; and $_N$ is 1 or 2, depending on the valence of M.

The acrylic acid compound is preferably acrylic acid. The divalent metal compound is preferably an alkaline earth metal compound and still more preferably magnesium hydroxide. The monovalent metal compound is preferably an alkali metal compound and still more preferably sodium hydroxide.

In one method of making the polymer of this invention, the metal compounds react with the acrylic acid compound to produce a precursor mixture comprised of the acrylic acid compound and the corresponding metal salts thereof. The precursor is then combined with a polymerization initiator to form the water soluble polymer of this invention.

The molar quantities of the metal compounds employed is less than the molar quantity of the acrylic acid compound. Accordingly, all of the acrylic acid compound is not converted to a metal salt thereof. In this regard, the ratio of divalent metal compound to acrylic acid compound is an amount in the range of from about 0.15 to about 0.5, more preferably from about 0.165 to about 0.35, and still more preferably from about 0.175 to about 0.225 moles divalent metal compound per mole of acrylic acid compound. The ratio of monovalent metal compound to acrylic acid compound is an amount in the range of from about 0.0 to about 0.5, preferably from about 0.15 to about 0.4, and still more preferably from about 0.25 to about 0.35, moles monovalent metal compound per mole of acrylic acid compound.

The acrylic acid compound in the polymerization reaction is preferably employed in water solution having in the range of from about 95 to about 100 percent acrylic acid compound by weight of solution. The divalent metal compound is employed as a solid material. The monovalent metal compound is preferably employed in water solution having in the range of from about 10 to about 50 percent monovalent metal compound by weight of solution.

The polymerization initiator employed herein in combination with the precursor mixture can be any free radical initiator present in the mixture in an amount sufficient to start the polymerization reaction. It is believed that a sufficient amount is an amount the range of from about 0.005 to about 0.5 grams of initiator per mole of acrylic acid compound in the precursor mixture. Examples of free radical initiators useful herein include tertiary butyl hydroperoxide, azo initiators, such as, 2,2'-Azobis(2-amidinopropane)dihydrochloride, 2,2'-Azobis[2-(2-imidazolin-2yl)propane]dihydrochloride, sodium persulfate, ammonium persulfate and sodium bromate. The polymerization initiator can be employed in an aqueous solution containing about 1 percent initiator by weight of solution.

The reactions involved in preparing the precursor mixture and the polymerization reaction are all exothermic in nature.

Upon completion of the polymerization reaction, the water soluble polymer composition can be reacted with a cross linking agent to produce a water insoluble, cross linked polymer composition which is referred to herein as a water gel or, more simply, a gel. The polymer composition is first dried to a solid which is then ground to a size which will pass a 30 mesh screen. Thereafter, the ground polymer is dissolved in a quantity of water to form an aqueous polymer solution which is reacted with a cross linking agent. The polymer solution contains in the range of from about 0.025 to about 0.1 pounds of polymer per pound of water.

The cross linking agent can be any trivalent metal, such as, chromium, aluminum, zirconium and iron. The preferred cross linking agent is chromium having a valence of +3. Examples of compounds containing the preferred cross linking agent include chromium acetate, chromium chloride and chromium citrate. In one example, a chromium cross linking agent can be made in situ by reacting sodium dichromate with sodium metabisulfite.

The quantity of cross linking agent to be employed to form the gel of this invention is an amount in the range of from an amount greater than about 0.005 to about 0.5 grams of cross linking agent per gram of polymer composition. The cross linking agent can be employed in a water solution containing the agent. The solution can contain in the range of from about 1 to about 70 percent cross linking agent by weight of solution.

If it is desired to cross link the water soluble polymer composition of this invention to make the water insoluble gel of this invention, then the molar quantity of divalent metal compound used to make the water soluble polymer composition of this invention is preferably greater than about 0.15 moles divalent metal compound per mole of acrylic acid compound.

The following examples illustrate various techniques for preparing the polymer composition and the gel of this invention. Study of the examples will perhaps reveal steps not specifically disclosed above.

EXAMPLES

Example 1

Several acrylic acid polymer compositions were prepared. The procedures employed and a table of results are set forth below.

Preparation of Polymer Composition

Weighed quantities of liquid acrylic acid and deionized water were placed in a glass reactor equipped with a stirring device, a thermometer and a sparge tube. Stirring was started and then a weighed quantity of solid material containing about 95 percent by weight magnesium hydroxide was added to the reactor. The reaction was exothermic so the reactor was cooled to maintain the reaction mixture temperature below 30° C. Thereafter, a weighed quantity of a 50 percent by weight aqueous solution of sodium hydroxide was added to the reactor. That reaction was also exothermic so the reactor was cooled to maintain the reaction temperature below 30° C. Nitrogen was introduced into the reactor through the sparge tube for about one hour to displace oxygen from the reactor. Thereafter, a 1 percent aqueous solution of tert-butylhydroperoxide, a polymerization initiator, was added to the reactor together with a vapor feed of sulfur dioxide. The resulting polymerization reaction was exothermic and caused a temperature increase, i.e., an exotherm, in the reaction mixture in an amount in the range of from about 20° to about 30° C. The polymerization reaction proceeded for about 3 hours, then the polymer was removed from the reactor, dried and, thereafter, ground to a size which would pass through a 30 mesh screen. Table 1, below, sets out further details of the preparation of the polymer composition.

TABLE 1

Preparation of Polymer Composition

| Ingredient | Grams | Moles |
| --- | --- | --- |
| Composition No. 1 | | |
| deionized water | 614.63 | |
| acrylic acid | 144.12 | 2.00 |
| 95% magnesium hydroxide | 30.70 | 0.50 |
| 50% sodium hydroxide | 40.00 | 0.50 |
| 1% tert-butyl hydroperoxide | 2.00 | |
| sulfur dioxide | vapor feed | |
| exotherm from: 21 to 45 degrees C. | | |
| Composition No. 2 | | |
| deionized water | 614.14 | |
| acrylic acid | 144.12 | 2.00 |

TABLE 1-continued

Preparation of Polymer Composition

| Ingredient | Grams | Moles |
|---|---|---|
| 95% magnesium hydroxide | 27.59 | 0.45 |
| 50% sodium hydroxide | 48.00 | 0.60 |
| 1% tert-butyl hydroperoxide | 2.00 | |
| sulfur dioxide | vapor feed | |
| exotherm from: 24 to 49 degrees C. | | |
| Composition No. 3 | | |
| deionized water | 609.47 | |
| acrylic acid | 144.12 | 2.00 |
| 95% magnesium hydroxide | 24.56 | 0.40 |
| 50% sodium hydroxide | 48.00 | 0.60 |
| 1% tert-butyl hydroperoxide | 2.00 | |
| sulfur dioxide | vapor feed | |
| exotherm from: 18 to 46 degrees C. | | |
| Composition No. 4 | | |
| deionized water | 606.96 | |
| acrylic acid | 144.12 | 2.00 |
| 95% magnesium hydroxide | 18.42 | 0.30 |
| 50% sodium hydroxide | 56.00 | 0.70 |
| 1% tert-butyl hydroperoxide | 2.00 | |
| sulfur dioxide | vapor feed | |
| exotherm from: 26 to 54 degrees C. | | |
| Composition No. 5 | | |
| deionized water | 608.24 | |
| acrylic acid | 144.12 | 2.00 |
| 95% magnesium hydroxide | 21.49 | 0.35 |
| 50% sodium hydroxide | 52.00 | 0.70 |
| 1% tert-butyl hydroperoxide | 2.00 | |
| sulfur dioxide | vapor feed | |
| exotherm from: 24 to 47 degrees C. | | |

Example 2

The polymer compositions prepared in Example 1 were reacted with a chromium cross linking agent. The procedures employed and tables of results are set forth below.

Preparation of Cross Linked Polymer Composition

Weighed quantities of polymer composition from Example 1 and deionized water were placed in a glass beaker. The glass beaker was equipped with a stirring device. Stirring was started and then a weighed quantity of deionized water was added to the beaker. A vortex was formed in the stirred contents. A weighed quantity of polymer composition was added to the beaker at the shoulder of the vortex. Stirring was continued until all of the polymer was dissolved. A chromium compound was then added to the dissolved polymer to produce a product.

The product was observed to determine whether or not a gel had been formed. Aging tests on the formed gels were performed in some cases.

Table 2, below, sets out further details of the preparation of the gel and related observations.

TABLE 2

Preparation of Cross Linked Polymer Composition

| Gel No. | Ingredient | Grams | Comment |
|---|---|---|---|
| 1.1 | deionized water | 190.00 | Gel formed. |
| | Polymer Composition No. 1 | 10.00 | Synersis noted after |
| | 45% aqueous solution of chromium acetate | 1.60 | 16 hours of aging at 400° F. |
| 1.2 | deionized water | 190.00 | Gel formed. |
| | Polymer Composition No. 1 | 10.00 | Synersis noted after |
| | 45% aqueous solution of chromium acetate | 0.80 | 16 hours of aging at 400° F. |
| 1.3 | deionized water | 190.00 | Gel formed. |
| | Polymer Composition No. 1 | 10.00 | Synersis noted after |
| | 45% aqueous solution of chromium acetate | 0.40 | 16 hours of aging at 400° F. |
| 1.4 | deionized water | 190.00 | 36 grams of gel |
| | Polymer Composition No. 1 | 10.00 | formed. |
| | 45% aqueous solution of chromium acetate | 0.20 | Aged 16 hours at 400° F. |
| 1.5 | deionized water | 190.00 | 72 grams of gel |
| | Polymer Composition No. 1 | 10.00 | formed. |
| | 45% aqueous solution of chromium acetate | 0.10 | Aged 16 hours at 400° F. |
| 2.1 | deionized water | 98.00 | no gel formed |
| | Polymer Composition No. 2 | 2.00 | |
| | 1% aqueous solution of sodium dichromate | 1.00 | |
| | 1% aqueous solution of sodium metabisulfite | 1.00 | |
| 2.2 | deionized water | 98.00 | Very weak gel formed |
| | Polymer Composition No. 2 | 2.00 | |
| | 1% aqueous solution of sodium dichromate | 2.00 | |
| | 1% aqueous solution of sodium metabisulfite | 2.00 | |
| 2.3 | deionized water | 98.00 | Weak gel formed |
| | Polymer Composition No. 2 | 2.00 | |
| | 1% aqueous solution of sodium dichromate | 3.00 | |
| | 1% aqueous solution of sodium metabisulfite | 6.00 | |
| 2.4 | deionized water | 98.00 | gel formed |
| | Polymer Composition No. 2 | 2.00 | aged 16 hours at |
| | 1% aqueous solution of sodium dichromate | 4.00 | 400° F. |
| | 1% aqueous solution of sodium metabisulfite | 4.00 | |

| Gel No. | Ingredient | Grams | Comments |
|---|---|---|---|
| 3.1 | deionized water | 190.00 | Aged 16 hours at 400° F. |
| | Polymer Composition 3 | 10.00 | 150 grams gel |
| | 45% aqueous solution of chromium acetate | 0.20 | 50 grams free water |
| 3.2 | deionized water | 190.00 | Aged 7 days at 400° F. |
| | Polymer Composition 3 | 10.00 | 150 grams gel |
| | 45% aqueous solution of chromium acetate | 0.20 | 50 grams free water |
| 3.3 | deionized water | 190.00 | Aged 14 days at 400° F. |
| | Polymer Composition 3 | 10.00 | 150 grams gel |
| | 45% aqueous solution of chromium acetate | 0.20 | 50 grams free water |
| 3.4 | deionized water | 190.00 | Aged 21 days at 400° F. |
| | Polymer Composition 3 | 10.00 | 150 grams gel |
| | 45% aqueous solution of chromium acetate | 0.20 | 50 grams free water |
| 3.5 | deionized water | 190.00 | Aged 28 days at 400° F. |
| | Polymer Composition 3 | 10.00 | 150 grams gel |
| | 45% aqueous solution of chromium acetate | 0.20 | 50 grams free water |

| Gel No. | Ingredient | Grams | Comment |
|---|---|---|---|
| 3.6 | deionized water | 196.00 | Gel formed |
| | Polymer Composition No. 3 | 2.00 | aged 64 hours at 450° F. |
| | 1% aqueous solution of sodium dichromate | 8.00 | |
| | 1% aqueous solution of sodium metabisulfite | 8.00 | |

| Gel No. | Ingredient | Grams | Comments |
|---|---|---|---|
| 4.1 | deionized water | 190.00 | No gel formed only |
| | Polymer Composition No. 4 | 10.00 | liquid |

TABLE 2-continued

Preparation of Cross Linked Polymer Composition

| | | | |
|---|---|---|---|
| 5.1 | 45% aqueous solution of chromium acetate | 0.50 | |
| | deionized water | 190.00 | Gel formed. |
| | Polymer Composition No. 5 | 10.00 | Some syneresis noted |
| | 45% aqueous solution of chromium acetate | 0.20 | after 16 hours of aging at 400° F. |

Note: Polymer composition No. 4 used to make gel no. 4.1 contained 0.15 moles magnesium hydroxide per mole of acrylic acid. Accordingly, a water insoluble gel was not formed.

Example 3

A water soluble polymer, identified herein as Polymer Composition No. 6, was prepared by reacting a copolymer containing 70 mole percent acrylic acid and 30 mole percent sodium acrylate in water solution with magnesium hydroxide to produce a random terpolymer containing 25 mole percent magnesium acrylate, 37.5 mole percent sodium acrylate and 37.5 mole percent acrylic acid.

Four hundred (400) grams of a 5% aqueous solution of the above mentioned random copolymer, 3.01 grams of the magnesium hydroxide and 21.79 grams of water were placed in a 500 ml glass blender. The mixture was thereafter stirred in the blender until all of the magnesium hydroxide was dissolved. The resulting terpolymer, Polymer Composition No. 6, was a 5% solution in water.

About 50 grams of Polymer Composition No. 6 was reacted with 0.4 grams of a 45% aqueous solution of chromium acetate. The reaction product, a water insoluble gel identified herein as Gel No. 6.1, was aged 16 hours at 140° F.

About 180 grams of Polymer Composition No. 6 was reacted with 1.44 grams of a 45% aqueous solution of chromium acetate. The reaction product, a water insoluble gel identified herein as Gel No. 6.2, was aged 16 hours at 400° F.

Example 4

A water soluble polymer, identified herein as Polymer Composition No. 7, was prepared by reacting acrylic acid, sodium acrylate and magnesium acrylate.

Preparation of Polymer Composition

Weighed quantities of liquid acrylic acid and deionized water were placed in a glass reactor equipped with a stirring device, a thermometer and a sparge tube. Stirring was started and then weighed quantities of 25% aqueous solutions of magnesium acrylate and sodium acrylate were added to the reactor. Nitrogen was introduced into the reactor through the sparge tube for about one hour to displace oxygen from the reactor. Thereafter, a 1 percent aqueous solution of 2,2'-Azobis(2-amidinopropane)dihydroxide (referred to as V-50), a polymerization initiator, was added to the reactor which was exposed to UV light. The resulting polymerization reaction was exothermic and caused a temperature increase, i.e., an exotherm, in the reaction mixture in an amount in the range of from about 21° to about 53° C. The polymerization reaction proceeded for about 3 hours, then the polymer was removed from the reactor, dried and, thereafter, ground to a size which would pass through a 30 mesh screen. Table 3, below, sets out further details of the preparation of the polymer composition.

TABLE 3

Preparation of Polymer Composition

| Ingredient | Grams | Moles |
|---|---|---|
| Composition No. 7 | | |
| deionized water | 271.83 | |
| acrylic acid | 36.03 | 0.5 |
| 25% magnesium acrylate | 332.84 | 0.5 |
| 25% sodium acrylate | 186.10 | 0.5 |
| 1% V-50 | 2.00 | |
| exotherm from: 21 to 53 degrees C. | | |

Example 5

The procedures employed in Example 2 were employed to prepare gels from Polymer Composition No. 7 (Example 4). Table 4, below, sets out further details of the preparation of the gel and related observations.

TABLE 4

Preparation of Cross Linked Polymer Composition

| Gel No. | Ingredient | Grams | Comment |
|---|---|---|---|
| 7.1 | Deionized water | 98.00 | Aged 16 hours at 140° F. |
| | Polymer Composition No. 7 | 2.00 | stable water insoluble gel |
| | 45% aqueous solution of chromium acetate | 0.20 | formed |
| 7.2 | Deionized water | 97.00 | Aged 16 hours at 140° F. |
| | Polymer Composition No. 7 | 3.00 | stable water insoluble gel |
| | 45% aqueous solution of chromium acetate | 0.20 | formed |
| 7.3 | Deionized water | 96.00 | Aged 16 hours at 140° F. |
| | Polymer Composition No. 7 | 4.00 | stable water insoluble gel |
| | 45% aqueous solution of chromium acetate | 0.20 | formed |
| 7.4 | Deionized water | 196.00 | Aged 16 hours at 400° F. |
| | Polymer Composition No. 7 | 4.00 | Stable water insoluble |
| | 45% aqueous solution of chromium acetate | 0.40 | gel formed |
| 7.5 | Deionized water | 194.00 | Aged 16 hours at 400° F. |
| | Polymer Composition No. 7 | 6.00 | Stable water insoluble |
| | 45% aqueous solution of chromium acetate | 0.40 | gel formed |
| 7.6 | Deionized water | 192.00 | Aged 16 hours at 400° F. |
| | Polymer Composition No. 7 | 8.00 | Stable water insoluble |
| | 45% aqueous solution of chromium acetate | 0.40 | gel formed |

Example 6

A water soluble polymer, identified herein as Polymer Composition No. 8, containing about 93 mole percent acrylamide and about 7 mole percent sodium acrylate was treated with a cross linking agent. Polymer Composition No. 8 is not an example of the water soluble composition of this invention.

The acrylamide copolymer were reacted with a 45% aqueous solution of chromium acetate. The procedures employed in Example 2 to prepare the gels were employed in this Example 6.

Table 5, below, sets out further details of the preparation of the gel and related observations.

TABLE 5

Preparation of Cross Linked Polymer Composition

| Gel No. | Ingredient | Grams | Comment |
|---|---|---|---|
| 8.1 | deionized water | 49.50 | Aged 16 hours at 140° F. |
|  | Polymer Composition No. 8 | 0.50 | gel formed |
|  | 45% aqueous solution of chromium acetate | 0.05 |  |
| 8.2 | deionized water | 198.00 | Aged 16 hours at 400° F. |
|  | Polymer Composition No. 8 | 2.00 | no gel left |
|  | 45% aqueous solution of chromium acetate | 0.20 |  |

Example 7

Table A, below, is based on Formula 1 and provides calculated molar combinations of acrylic acid compound (AAC), divalent metal compound ($YM_Z$) and monovalent metal compound ($X_NM$) required to produce specific variations of the water soluble polymer of this invention.

TABLE A

| | | Formula 1 | | | Moles of monovalent and divalent metal compound and acrylic acid compound in Formula 1 | | | Ratios | | |
|---|---|---|---|---|---|---|---|---|---|---|
| | | | | | moles | moles | moles | moles $X_NM$ per mole AAC | moles $YM_Z$ per mole AAC | moles $X_NM$ per mole $YM_Z$ |
| | a | b | c | | $X_NM$ | $YM_Z$ | AAC | | | |
| 1 | 1 | 2.250 | 0.700 | | 2.250 | 0.700 | 4.650 | 0.484 | 0.151 | 3.214 |
| 2 | 1 | 2.250 | 1.000 | | 2.250 | 1.000 | 5.250 | 0.429 | 0.190 | 2.250 |
| 3 | 1 | 1.125 | 0.700 | | 1.000 | 0.700 | 3.525 | 0.284 | 0.199 | 1.429 |
| 4 | 1 | 1.000 | 0.700 | | 1.000 | 0.700 | 3.400 | 0.294 | 0.206 | 1.429 |
| 5 | 1 | 1.125 | 1.000 | | 1.125 | 1.000 | 4.125 | 0.273 | 0.242 | 1.125 |
| 6 | 1 | 1.000 | 1.000 | | 1.000 | 1.000 | 4.000 | 0.250 | 0.250 | 1.000 |
| 7 | 1 | 2.250 | 1.750 | | 2.250 | 1.750 | 6.750 | 0.333 | 0.259 | 1.286 |
| 8 | 1 | 0.000 | 0.700 | | 0.000 | 0.700 | 2.400 | 0.000 | 0.292 | 0.000 |
| 9 | 1 | 1.125 | 1.750 | | 1.125 | 1.750 | 5.625 | 0.200 | 0.311 | 0.643 |
| 10 | 1 | 2.250 | 2.750 | | 2.250 | 2.750 | 8.750 | 0.257 | 0.314 | 0.818 |
| 11 | 1 | 1.000 | 1.750 | | 1.000 | 1.750 | 5.500 | 0.182 | 0.318 | 0.571 |
| 12 | 1 | 0.000 | 1.000 | | 0.000 | 1.000 | 3.000 | 0.000 | 0.333 | 0.000 |
| 13 | 1 | 1.125 | 2.750 | | 1.125 | 2.750 | 7.625 | 0.148 | 0.361 | 0.409 |
| 14 | 1 | 1.000 | 2.750 | | 1.000 | 2.750 | 7.500 | 0.133 | 0.367 | 0.364 |
| 15 | 1 | 0.000 | 1.750 | | 0.000 | 1.750 | 4.500 | 0.000 | 0.389 | 0.000 |
| 16 | 1 | 0.000 | 2.750 | | 0.000 | 2.750 | 6.500 | 0.000 | 0.423 | 0.000 |

Within the context of Formula 1, as seen in Table A, the number of moles of monovalent metal compound required to make the polymer of this invention is in the range of from about 0 to about 2.25; the number of moles of divalent metal compound required to make the polymer of this invention is in the range of from about 0.70 to about 2.75; and the number of moles of acrylic acid compound required to make the polymer of this invention is in the range of from about 2.40 to about 8.75. Notice that the minimum molar ratio of divalent metal compound to acrylic acid compound is about 0.15 moles divalent metal compound per mole of acrylic acid compound. Table A was constructed under the assumption that the valence of M is 1; therefor, the value of $_N$ is 1 and the value of $_Z$ is 2.

Example 8

Table B, below, is similar to Table A. Table B is based on Formula 1 and provides calculated weight combinations of units "a", "b," and "c" as they exist in the polymer of this invention. The data in Table B assumes the polymer is made by reacting acrylic acid, sodium hydroxide and magnesium hydroxide. The weight of one acrylic acid unit "a" is 72.06. The weight of one sodium acrylate unit "b" is 94.05. The weight of one magnesium acrylate unit "c" is 166.16.

TABLE B

| | Formula 1 weight units | | | | Formula 1 weight percent of polymer | | | |
|---|---|---|---|---|---|---|---|---|
| | a | b | c | | a | b | c | total |
| | 72.06 | 94.05 | 166.16 | polymer | | | | |
| 1 | 72.060 | 211.613 | 116.312 | 399.985 | 18.016 | 52.905 | 29.079 | 100.000 |
| 2 | 72.060 | 211.613 | 166.160 | 449.833 | 16.019 | 47.043 | 36.938 | 100.000 |
| 3 | 72.060 | 105.806 | 116.312 | 294.178 | 24.495 | 35.967 | 39.538 | 100.000 |
| 4 | 72.060 | 94.050 | 116.312 | 282.422 | 25.515 | 33.301 | 41.184 | 100.000 |
| 5 | 72.060 | 105.806 | 166.160 | 344.026 | 20.946 | 30.755 | 48.299 | 100.000 |
| 6 | 72.060 | 94.050 | 166.160 | 332.270 | 21.687 | 28.305 | 50.008 | 100.000 |

TABLE B-continued

| | Formula 1 weight units | | | | Formula 1 weight percent of polymer | | | |
|---|---|---|---|---|---|---|---|---|
| | a | b | c | | a | b | c | total |
| | 72.06 | 94.05 | 166.16 | polymer | | | | |
| 7 | 72.060 | 211.613 | 290.780 | 574.453 | 12.544 | 36.837 | 50.619 | 100.000 |
| 8 | 72.060 | 0.000 | 116.312 | 188.372 | 38.254 | 0.000 | 61.746 | 100.000 |
| 9 | 72.060 | 105.806 | 290.780 | 468.646 | 15.376 | 22.577 | 62.047 | 100.000 |
| 10 | 72.060 | 211.613 | 456.940 | 740.613 | 9.730 | 28.573 | 61.698 | 100.000 |
| 11 | 72.060 | 94.050 | 290.780 | 456.890 | 15.772 | 20.585 | 63.643 | 100.000 |
| 12 | 72.060 | 0.000 | 166.160 | 238.220 | 30.249 | 0.000 | 69.751 | 100.000 |
| 13 | 72.060 | 105.806 | 456.940 | 634.806 | 11.352 | 16.667 | 71.981 | 100.000 |
| 14 | 72.060 | 94.050 | 456.940 | 623.050 | 11.566 | 15.095 | 73.339 | 100.000 |
| 15 | 72.060 | 0.000 | 290.780 | 362.840 | 19.860 | 0.000 | 80.140 | 100.000 |
| 16 | 72.060 | 0.000 | 456.940 | 529.000 | 13.622 | 0.000 | 86.378 | 100.000 |

Based on the data calculated in Table B, unit "a" is present in the polymer in an amount in the range of from about 9 to about 39 percent by weight of the polymer, unit "b" is present in the polymer in an amount in the range of from about 0 to about 53 percent by weight of the polymer and unit "c" is present in the polymer in an amount in the range of from about 29 to about 87 percent by weight of the polymer.

The invention claimed is:

1. A method of making a gel which is not water soluble comprised of making a water soluble polymer of an acrylic acid compound comprising:
   combining an acrylic acid compound with a reactant selected from the group consisting of a divalent metal salt of said acrylic acid compound, a monovalent metal salt of said acrylic acid compound and mixtures thereof to form a polymer precursor,
   combining a polymerization initiator with said precursor,
   permitting said precursor to form said water soluble polymer, and
   combining said water soluble polymer with a cross linking agent to form said gel; wherein
   said polymer precursor contains in the range of from about 0.65 to about 2.75 units of said divalent metal salt of said acrylic acid compound per unit of said acrylic acid compound and in the range of from about 0 to about 2.25 units of said monovalent metal salt of said acrylic acid compound per unit of said acrylic acid compound, and
   said acrylic acid compound is represented by the formula $CH_2=CR-COOH$ and R is hydrogen or a methyl group
and further wherein
   said gel is stable at temperatures up to about 450 degrees Fahrenheit.

2. The method of claim 1 wherein said polymerization initiator is a free radical initiator.

3. The method of claim 2 wherein said cross linking agent is a compound containing a trivalent metal.

4. The method of claim 2 wherein said cross linking agent is a compound containing chromium having a valence of +3.

5. The method of claim 2 wherein said acrylic acid compound is acrylic acid, said divalent metal salt is magnesium acrylate and said monovalent metal salt is an alkali metal acrylate.

6. The method of claim 4 wherein said divalent metal salt is the reaction product of acrylic acid and a magnesium compound selected from magnesium oxide, magnesium hydroxide and magnesium carbonate and said monovalent metal salt is the reaction product of acrylic acid and a sodium compound selected from sodium oxide, sodium hydroxide and sodium carbonate.

7. The method of claim 6 wherein said cross linking agent is chromium acetate, said sodium compound is sodium hydroxide and said magnesium compound is magnesium hydroxide.

8. A method of making a gel which is not water soluble comprised of making a water soluble polymer comprising:
   forming a polymer precursor by mixing an acrylic acid compound with a material selected from the group consisting of a divalent metal compound, a monovalent metal compound and mixtures thereof,
   combining a polymerization initiator with said precursor,
   permitting said precursor to form said water soluble polymer and
   combining said water soluble polymer with a cross linking agent to form said gel; wherein
   the ratio of said monovalent metal compound to said acrylic acid compound in said precursor is an amount in the range of from about 0 to about 0.5 moles of said monovalent metal compound per mole of said acrylic acid compound and the ratio of said divalent metal compound to said acrylic acid compound in said precursor is an amount in the range of from about 0.15 to about 0.5 moles of said divalent metal compound per mole of said acrylic acid compound;
   said acrylic acid compound is represented by the formula $CH_2=CR-COOH$ wherein R is hydrogen or a methyl group;
   said monovalent metal compound is represented by the general formula $X_NM$ and said divalent metal compound is represented by the general formula $YM_z$ wherein Y is beryllium, magnesium calcium, strontium, barium or zinc; X is sodium, potassium, lithium, rubidium, cesium or an ammonia group; M is oxygen, a hydroxide group or a carbonate group; $z$ is 1 or 2, and $N$ is 1 or 2; and
   said gel is stable at temperatures up to about 450 degrees Fahrenheit.

9. The method of claim 8 wherein R is hydrogen, X is sodium, Y is magnesium, M is a hydroxide group, $z$ is 2, and $N$ is 1.

10. A method of adjusting the permeability of a subsurface formation to regulate the flow of water in said formation, said method being comprised of the steps of introducing into said subsurface formation a gel which is not water soluble and is stable at temperatures up to about 450 degrees Fahrenheit, wherein said gel is made by the steps of combining an aqueous solution of acrylic acid with a reactant selected from the group consisting of an alkaline earth metal salt of acrylic acid, an alkali metal salt of acrylic acid and mixtures thereof to form a polymer precursor, combining a polymerization initiator with said precursor and permitting said precursor to form a water soluble polymer and thereafter, combining said war soluble polymer with a cross linking agent to form said gel; wherein said acrylic acid, said alkaline earth metal salt and said alkali metal salt are combined in a ratio in the range of from about 0.65 to about 2.75 units of said alkaline earth metal salt per unit of said acrylic acid and in the range of from about 0 to about 2.25 units of said alkali metal salt per unit of said acrylic acid.

11. The method of claim 10 wherein said alkaline earth metal salt is magnesium acrylate and said alkali metal salt is sodium acrylate.

12. A method of adjusting the permeability of a subsurface formation to regulate the flow of water in said formation, said method being comprised of the steps of introducing into said subsurface formation a gel which is not water soluble and is stable at temperatures up to about 450 degrees Fahrenheit, wherein said gel is made by the steps of forming a polymer precursor by mixing acrylic acid with a material selected from the group consisting of magnesium hydroxide, sodium hydroxide and mixtures thereof, combining a polymerization initiator with said precursor and permitting said precursor to form a water soluble polymer and thereafter, combining said water soluble polymer with a cross linking agent to form said gel; wherein the ratio of said sodium hydroxide to said acrylic acid in said precursor is an amount in the range of from about 0 to about 0.5 moles of said sodium hydroxide per mole of said acrylic acid and the ratio of said magnesium hydroxide to said acrylic acid in said precursor is an amount in the range of from about 0.15 to about 0.5 moles of said magnesium hydroxide per mole of said acrylic acid.

* * * * *